United States Patent
Motomori et al.

(10) Patent No.: US 7,075,275 B2
(45) Date of Patent: Jul. 11, 2006

(54) DC-DC CONVERTER

(75) Inventors: Mikio Motomori, Osaka (JP); Takuya Ishii, Osaka (JP); Takashi Ryu, Kyoto (JP); Hiroki Akashi, Osaka (JP); Hirohisa Tanabe, Kyoto (JP); Makoto Ishimaru, Osaka (JP); Tomoya Shigemi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/280,314

(22) Filed: Nov. 17, 2005

(65) Prior Publication Data

US 2006/0103332 A1 May 18, 2006

(30) Foreign Application Priority Data

Nov. 18, 2004 (JP) .............................. 2004-334850

(51) Int. Cl.
*G05F 1/70* (2006.01)
*H05B 4/24* (2006.01)

(52) U.S. Cl. ...................................... 323/207; 315/283

(58) Field of Classification Search ................ 315/226, 315/283; 323/222, 232, 244, 323, 207
See application file for complete search history.

(56) References Cited

U.S. PATENT DOCUMENTS

| | | | |
|---|---|---|---|
| 4,674,020 A | | 6/1987 | Hill |
| 6,515,463 B1 * | | 2/2003 | Ling ........................ 323/315 |
| 6,933,706 B1 * | | 8/2005 | Shih ......................... 323/222 |
| 6,949,961 B1 * | | 9/2005 | Robb et al. ................ 327/52 |
| 6,956,361 B1 * | | 10/2005 | Mozipo et al. ............. 323/283 |

FOREIGN PATENT DOCUMENTS

JP        06-189528        7/1994

\* cited by examiner

*Primary Examiner*—Tuyet Vo
*Assistant Examiner*—Minh Dieu A
(74) *Attorney, Agent, or Firm*—McDermott Will & Emery LLP

(57) ABSTRACT

A DC-DC converter has switching means which generates a continuous switching voltage having a specified period from an input voltage and outputs the generated switching voltage, output voltage generating means which receives the switching voltage at an inductor and generates an output voltage obtained by rectifying and smoothing a voltage generated in the inductor, lamp signal generating means which generates a lamp signal and outputs the generated lamp signal, and control means which performs an arithmetic operation using a current signal relative to a current flowing in the inductor, an error signal relative to the output voltage, and the lamp signal to generate a control signal for controlling the operation of the switching means and outputs the generated control signal to the switching means. The lamp signal generating means includes first signal generating means for generating a first output signal based on a frequency divided signal having first and second periods obtained by dividing the time of a clock signal having the specified period and second signal generating means for generating a second output signal having a phase 180 degrees different from the phase of the first output signal based on the frequency divided signal, generates the lamp signal which rises after being held at a constant value for a specified time period in each of the first and second periods, and outputs the generated lamp signal.

7 Claims, 6 Drawing Sheets

FIG. 1

DC-DC CONVERTER

CROSS-REFERENCE TO RELATED APPLICATIONS

The teachings of Japanese Patent Application JP 2004-334850, filed Nov. 18, 2004, are entirely incorporated herein by reference, inclusive of the specification, drawings, and claims.

BACKGROUND OF THE INVENTION

The present invention relates to a DC-DC converter in a current-mode control system which has a synchronization function to external clock.

In recent years, switching-type DC-DC converters have been used frequently in power supply circuits for supplying power source voltages to electronic circuits in various electronic equipment represented by mobile equipment. As energy saving and multiple functions have been increasingly required of the equipment, these power supply circuits have been requested to have a synchronous operation function when a plurality of DC-DC converters are provided in combination or respond at a higher speed during a transient time such as a sudden load change. To respond to the requests, a DC-DC converter in a current-mode control system which is excellent in high-speed responsivity has been used.

Referring to FIGS. 6A and 6B, a DC-DC converter in a current-mode control system will be described herein below.

A description will be given first to a typical circuit structure of the DC-DC converter in the current mode control system with reference to FIG. 6A.

As shown in FIG. 6A, a high-side switch 11 and a low-side switch 12 are connected in series and an input voltage Vin is applied thereto. The high-side switch 11 and the low-side switch 12 are alternately turned ON/OFF so that a switching voltage is generated at a connection point between the high-side and low-side switches 11 and 12.

An inductor 13 and a capacitor 14, which are connected to the connection point between the high-side and low-side switches 11 and 12, constitute an LC filter. The LC filter rectifies and smoothes the switching voltage generated at the connection point between the high-side and low-side switches 11 and 12 and generates an output voltage Vout.

An error amplifier 15 compares the output voltage Vout with a reference voltage Vref, amplifies the result of the comparison, and outputs an error signal Ve. A lamp signal generating circuit 16 outputs a lamp signal Vc having a sawtooth waveform and synchronous with a clock signal CLK. An arithmetic operation circuit 17 subtracts the lamp signal Vc from the error signal Ve and produces an output signal (Ve–Vc). A current detecting circuit 18 detects a current flowing in the inductor 13 and outputs a current signal Vi. A comparator 19 compares the output signal (Ve–Vc) from the arithmetic operation circuit 17 with the current signal Vi and outputs the result of the comparison.

An RS latch 20 is set by the clock signal CLK, reset based on the output signal (Ve–Vc) from the comparator 19, and outputs a drive signal to each of the high-side and low-side switches 11 and 12.

A description will be given next to the operation of a typical DC-DC converter in a current-mode control system.

First, when the RS latch 20 is set by the clock signal CLK, the high-side switch 11 is turned ON, while the low-side switch 12 is turned OFF. At this time, a differential voltage (Vin–Vout) between the input voltage Vin and the output voltage Vout is applied to the inductor 13. Since the inductor 13 is magnetized by the differential voltage (Vin–Vout), a current flowing in the inductor 13 increases. Accordingly, the current signal Vi relative to the current flowing in the inductor 13 also increases. On the other hand, the lamp signal generating circuit 16 gradually increases the lamp signal Vc from zero so that the output signal (Ve–Vc) as the result of the arithmetic operation between the error signal Ve and the lamp signal Vc in the arithmetic operation circuit 17 gradually decreases. When the level of the current signal Vi exceeds that of the output signal (Ve–Vc), the output signal from the comparator 19 is inverted so that the RS latch 20 is reset by the inverted output signal. This turns OFF the high-side switch 11 and turns ON the low-side switch 12.

When the high-side switch 11 is in the OFF state and the low-side switch 12 is in the ON state, the output voltage Vout is reversely applied to the inductor 13. As a result, the inductor 13 is demagnetized by a voltage (–Vout) so that the current flowing in the inductor 13 decreases. The resulting state continues till the RS latch 20 is set again by the clock signal CLK to turn ON the high-side switch 11 and turn OFF the low-side switch 12. An output voltage Vout is supplied by repeating the foregoing operation.

A description will be given next to the operation of stabilizing the output voltage Vout.

When the output voltage Vout shows a tendency to exceed a desired value, the error amplifier 15 lowers the error signal Ve. Accordingly, the level difference by which the current signal Vi is higher than the output signal (Ve–Vc) from the arithmetic operation circuit 17 also decreases to consequently reduce the current flowing in the inductor 13. In other words, the suppression of power supplied to the output eventually lowers the output voltage Vout. Conversely, when the output voltage Vout lowers, an operation opposite to the operation described above is performed to raise the output voltage Vout.

FIG. 6B shows the respective operation waveforms of the clock signal CLK, the lamp signal Vc, the output signal (Ve–Vc) from the arithmetic operation circuit 17, and the current signal Vi.

There has been known a phenomenon in which such a control operation becomes unstable when the ON time of the high-side switch 11 accounts for 50% or more of the switching period in the absence of the lamp signal Vc from the lamp signal generating circuit 16. To improve the phenomenon of such an unstable control operation, a technology termed slope compensation has been proposed which superimposes the lamp signal Vc on the error signal Ve with which the current signal Vi is compared. With regards to the slope compensation, a technology which sets the slope of the lamp signal from the output voltage is disclosed in, e.g., Patent Document 1, while a technology which sets the slope of the lamp signal from the input/output voltages has been disclosed in Patent Document 2.

SUMMARY OF THE INVENTION

Although the prior art technology described above has generated the lamp signal Vc in synchronization with the clock signal CLK, the slope compensation is inherently required with a timing when a time period corresponding to 50% of one switching period has elapsed or thereafter. It follows therefore that, if the lamp signal Vc is increased from the beginning of one switching period in synchronization with the clock signal CLK, the output signal (Ve–Vc) compared with the current signal Vi excessively lowers in level at the end of the switching period when one switching period is long. In other words, since the current signal Vi is suppressed to a low level during a low-input-voltage operation in which the ON time of the high-side switch 11 is longer, a sufficient power cannot be supplied to the output. Conversely, if a sufficient output power is to be supplied during the low-input-voltage operation, the output power more than necessary is supplied disadvantageously during a high-input-voltage operation.

In view of this, the lamp signal Vi preferably starts to increase in the second half of one switching period when it is needed. If consideration is given to the characteristic variations of the individual elements in an actual situation, the lamp signal Vi more preferably starts to increase when a time period corresponding to about 40% of one switching period has elapsed. In the case where the clock signal CLK is generated in the DC-DC converter, it is easy to make settings such that the lamp signal Vc starts to increase when a time period corresponding to 40% of one switching period has elapsed. However, in the case where the clock signal CLK is inputted from outside the DC-DC converter, i.e., where an external synchronization function is required of the DC-DC converter, it is difficult to make settings such that the lamp signal CLK starts to increase when the time period corresponding to 40% of one switching period has elapsed.

In view of the foregoing, it is therefore an object of the present invention to provide a DC-DC converter in a current mode control system equipped which has an external synchronization function and allows a lamp signal necessary for slope compensation to start to increase at a time corresponding to a specified percentage, e.g., 40% of one switching period.

To attain the object, a DC-DC converter according to an aspect of the present invention includes: switching means which receives an input voltage and generates a continuous switching voltage having a specified period from the input voltage; output voltage generating means which receives the switching voltage from the switching means at an inductor and generates an output voltage obtained by rectifying and smoothing a voltage generated in the inductor; lamp signal generating means which generates a lamp signal and outputs the generated lamp signal; and control means which performs an arithmetic operation using a current signal relative to a current flowing in the inductor, an error signal responsive to the output voltage, and the lamp signal from the lamp signal generating means to generate a control signal for controlling an operation of the switching means and outputs the generated control signal to the switching means. The lamp signal generating means includes: first signal generating means for generating a first output signal based on a frequency divided signal having first and second periods obtained by dividing a time of a clock signal having the specified period; and second signal generating means for generating a second output signal having a phase 180 degrees different from a phase of the first output signal based on the frequency divided signal, generates the lamp signal which rises after being held at a constant value for a specified time period in each of the first and second periods, and outputs the generated lamp signal.

In the DC-DC converter according to the aspect of the present invention, the lamp signal which rises after being held at the constant value for the given time period can be generated by using the first output signal and the second output signal having the phase 180 degreees different from that of the first output signal. This allows the lamp signal for slope compensation which increases after the lapse of a time period corresponding to a specified percentage of the period of an arbitrary external clock signal to be generated in the external-synchronization-type DC-DC converter in a current-mode control system. As a result, it becomes possible to supply a sufficient output power during a low-input-voltage operation without excessively enhancing an output power supplying ability during a high-input-voltage operation.

In the DC-DC converter according to the aspect of the present invention, the lamp signal generating means further includes: a frequency dividing circuit for dividing the frequency of the clock signal and outputting the frequency divided signal, the first signal generating means includes at least a first series circuit composed of a first capacitor having a first electrostatic capacitance and a second capacitor having a second electrostatic capacitance. The first series circuit operates based on the frequency divided signal. The first series circuit is discharged at an initiation of the first period and then charged with a constant current later in the first period. The first series circuit holds, in the second period, a voltage resulting from the charging in the first period. The second signal generating means includes at least a second series circuit composed of a third capacitor having a third electrostatic capacitance equal to the first electrostatic capacitance and a fourth capacitor having a fourth electrostatic capacitance equal to the second electrostatic capacitance. The second series circuit operates based on the frequency divided signal. The second series circuit is discharged at an initiation of the second period and then charged with a constant current later in the second period. The second series circuit holds, in the first period, a voltage resulting from the charging in the second period. The lamp signal generating means holds the lamp signal at the constant value during a time period in the first period till a voltage of the first series circuit corresponding to the first output signal reaches a voltage of the fourth capacitor corresponding to the second output signal and during a time period in the second period till a voltage of the second series circuit corresponding to the second output signal reaches a voltage of the second capacitor corresponding to the first output signal.

The arrangement allows the lamp signal generating means to generate the lamp signal which rises after being held at the constant value for the specified time period.

In the DC-DC converter according to the aspect of the present invention, the first electrostatic capacitance is preferably smaller than the second electrostatic capacitance.

The arrangement allows the setting of the time period during which the lamp signal necessary for slope compensation is generated such that it corresponds to a percentage less than 50% of one switching period.

In the DC-DC converter according to the aspect of the present invention, the lamp signal generating means further includes: a frequency dividing circuit for dividing the frequency of the clock signal and outputting the frequency divided signal. The first signal generating means includes at least a first capacitor having a first electrostatic capacitance, the first capacitor being charged with a constant current having a first value in the first period based on the frequency divided signal and then discharged to supply a constant current having a second value in the second period. The second signal generating means includes at least a second capacitor having a second electrostatic capacitance equal to the first electrostatic capacitance, the second capacitor being discharged to supply the constant current having the second value in the first period based on the frequency divided signal and then charged with the constant current having the first value in the second period. The lamp signal generating means holds the lamp signal at the constant value during a time period in the first period till a voltage of the first capacitor corresponding to the first output signal reaches a voltage of the second capacitor corresponding to the second output signal and during a time period in the second period till the voltage of the second capacitor corresponding to the second output signal reaches the voltage of the first capacitor corresponding to the first output signal.

The arrangement allows the lamp signal generating means to generate the lamp signal which rises after being held at the constant value for the specified time period.

In the DC-DC converter according to the aspect of the present invention, the first value is preferably smaller than the second value.

The arrangement allows the setting of the time period during which the lamp signal necessary for slope compensation is generated such that it corresponds to a percentage less than 50% of one switching period.

In the DC-DC converter according to the aspect of the present invention, the lamp signal generating means preferably discharges the first capacitor before the first capacitor is charged with the constant current in the first period and discharges the second capacitor before the second capacitor is charged with the constant current in the second period.

The arrangement allows the lamp signal for slope compensation to be generated in the second half of the period.

In the DC-DC converter according to the aspect of the present invention, the lamp signal generating means preferably includes a plurality of lamp signal generating means each for outputting the lamp signal and a signal obtained by adding up the respective lamp signals outputted from the plurality of lamp signal generating means is preferably outputted to the control means.

The arrangement allows the slope of the lamp signal to be larger in the second half of the period so that the slope compensation is intensified in the second half of the period.

BRIEF DESCRIPTION OF THE DRAWINGS

FIG. 1 is a circuit structural view of a DC-DC converter according to a first embodiment of the present invention;

DETAILED DESCRIPTION OF THE INVENTION

Figure 2:
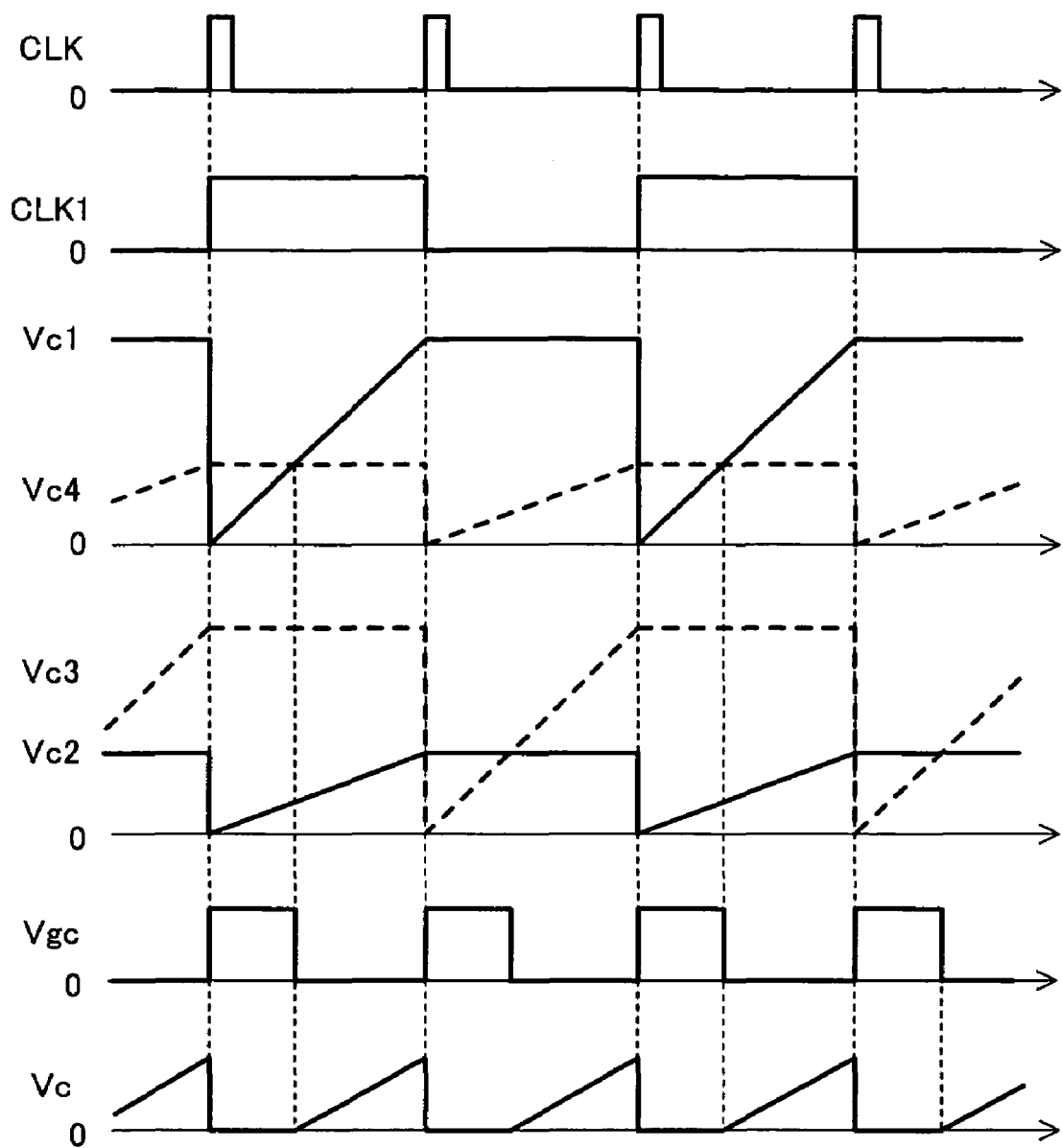
FIG. 2 is an operation waveform chart of the individual components of a lamp signal generating circuit 100 composing the DC-DC converter according to the first embodiment.

Referring now to the drawings, the individual embodiments of the present invention will be described herein below.

EMBODIMENT 1

Figure 1:
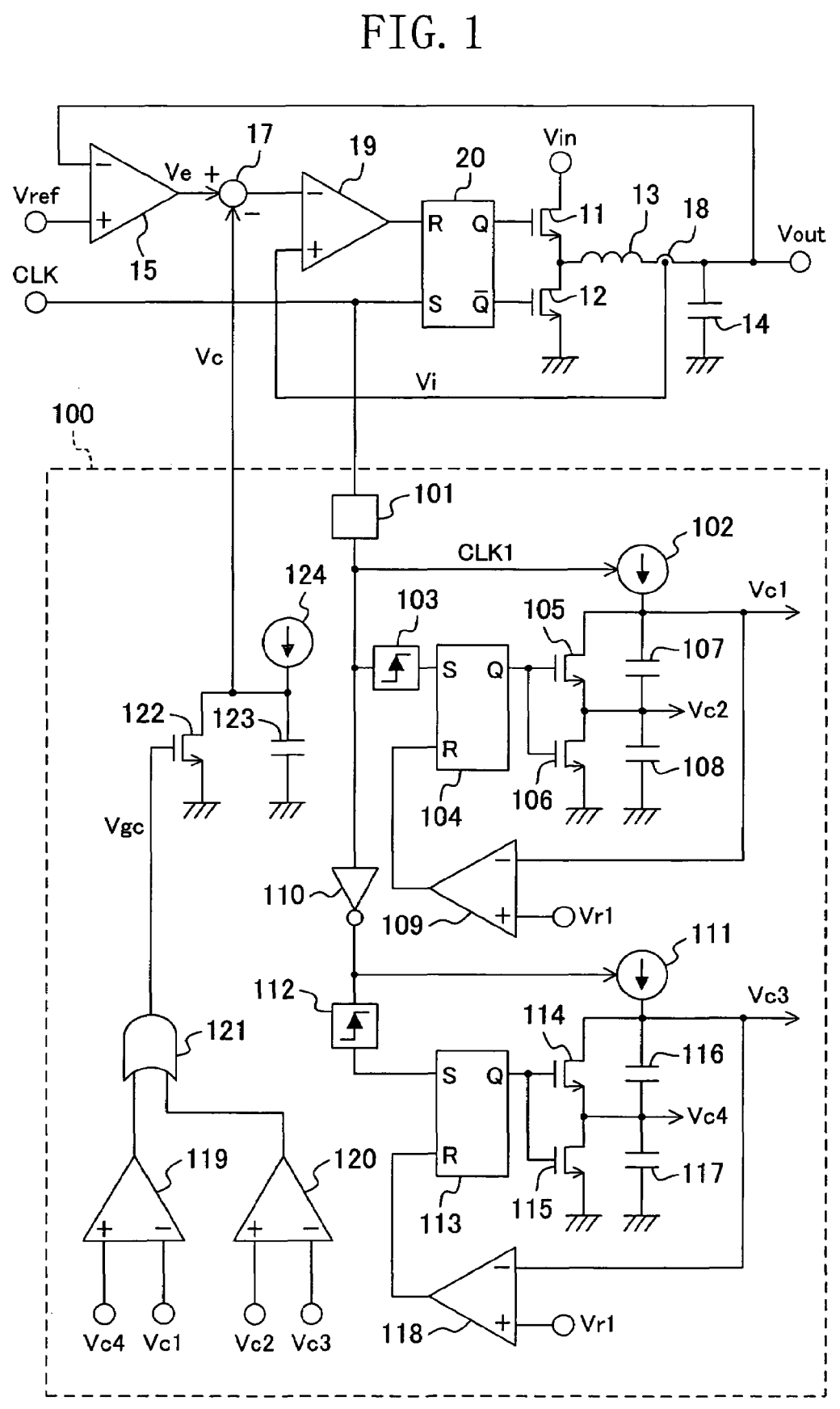

A DC-DC converter according to a first embodiment of the present invention will be described herein below with reference to FIGS. 1 and 2.

FIG. 1 is a circuit structural view of the DC-DC converter according to the first embodiment.

As shown in FIG. 1, a high-side switch 11 and a low-side switch 12 are connected in series and an input voltage Vin is applied thereto. The high-side switch 11 and the low-side switch 12 (switching means) are alternately turned ON/OFF so that a switching voltage is generated at connection point between the high-side and low-side switches 11 and 12.

An inductor 13 and a capacitor 14, which are connected to the connection point between the high-side and low-side switches 11 and 12, constitute an LC filter (output voltage generating means). The LC filter rectifies and smoothes the switching voltage generated at the connection point between the high-side and low-side switches 11 and 12 and generates an output voltage Vout.

An error amplifier 15 compares the output voltage Vout with a reference voltage Vref, amplifies the result of the comparison, and outputs an error signal Ve. A lamp signal generating circuit (lamp signal generating means) 100 outputs a lamp signal Vc having a sawtooth waveform and synchronous with a clock signal CLK. An arithmetic operation circuit 17 subtracts the lamp signal Vc from the error signal Ve and produces an output signal (Ve–Vc). A current detecting circuit 18 detects a current flowing in an inductor 13 and outputs a current signal Vi. A comparator 19 compares an output signal (Ve–Vc) from the arithmetic operation circuit 17 with the current signal Vi and outputs the result of the comparison.

An RS latch 20 is set by the clock signal CLK, reset based on an output signal from the comparator 19, and outputs a drive signal to each of the high-side and low-side switches 11 and 12. It is to be noted that control means is constituted herein by, e.g., the arithmetic operation circuit 17, the comparator 19, and the RS latch 20. The control means performs an arithmetic operation using the error signal Ve from the error amplifier 15, the current signal Vi relative to the current flowing in the inductor 13, and the lamp signal Vc from the lamp signal generating circuit 100 and outputs a control signal (drive signal) for controlling the operation of the switching means.

A description will be given herein below to the operation of the DC-DC converter shown in FIG. 1 with reference to FIG. 2.

First, when the RS latch 20 is set by the clock signal CLK, the high-side switch 11 is turned ON, while the low-side switch 12 is turned OFF. At this time, a differential voltage (Vin–Vout) between the input voltage Vin and the output voltage Vout is applied to the inductor 13. Since the inductor 13 is magnetized by the differential voltage (Vin–Vout), a current flowing in the inductor 13 increases. Accordingly, the current signal Vi relative to the current flowing in the inductor 13 also rises in level. When the level of the current signal Vi exceeds that of the output signal (Ve–Vc) from the arithmetic operation circuit 17, the output signal from the comparator 19 is inverted so that the RS latch 20 is reset by the inverted output signal. This turns OFF the high-side switch 11 and turns ON the low-side switch 12.

When the high-side switch 11 is in the OFF state and the low-side switch 12 is in the ON state, the output voltage Vout is reversely applied to the inductor 13. As a result, the inductor 13 is demagnetized by a voltage (–Vout) so that the current flowing in the inductor 13 decreases. The resulting state continues till the RS latch 20 is set again by the clock signal CLK to turn ON the high-side switch 11 and turn OFF the low-side switch 12. An output voltage Vout is supplied by repeating the foregoing operation.

When the output voltage Vout shows a tendency to exceed a desired value, the error amplifier 15 lowers the error signal Ve. Accordingly, the level difference by which the current signal Vi is higher than the output signal (Ve−Vc) from the arithmetic operation circuit 17 also decreases to consequently reduce the current flowing in the inductor 13. In other words, the suppression of power supplied to the output eventually lowers the output voltage Vout. Conversely, when the output voltage Vout shows a tendency to be lower than the desired value, an operation opposite to the operation described above is performed to raise the output voltage Vout. In this manner, the output voltage Vout is stabilized to have the desired value.

A description will be given next to the structure of the lamp signal generating circuit 100 shown in FIG. 1.

In the lamp signal generating circuit 100 of FIG. 1, a frequency dividing circuit 101 halves the frequency of the clock signal CLK and outputs a frequency divided signal CLK1 having a period double the period of the clock signal CLK. A first constant current circuit 102 receives the frequency divided signal CLK1 and allows a constant current Ic to flow when the frequency divided signal is on the "H" level. A first rising edge detecting circuit 103 receives the frequency divided signal CLK1 and outputs a one-shot pulse in synchronization with the rising edge of the frequency divided signal CLK1. A first RS latch 104 is set by the one-shot pulse from the first rising edge detecting circuit 103. Each of a first N-channel FET 105 and a second N-channel FET 106, which are connected in series, receives an output signal from the first RS latch 104 at the gate thereof. A first capacitor 107 having a first electrostatic capacitance and a second capacitor 108 having a second electrostatic capacitance are connected in series. The first capacitor 107 is connected between the drain and source of the first N-channel FET 105. The second capacitor 108 is connected between the drain and source of the second N-channel FET 106. The first N-channel FET 105 and the first capacitor 107 are connected to the first constant current circuit 102. The second N-channel FET 106 and the second capacitor 108 are grounded. A first comparator 109 compares the voltage Vc1 (included in a first output signal) of a series circuit composed of the first and second capacitors 107 and 108 with a reference voltage Vr1 and outputs the result of the comparison. The reference voltage Vr1 is adjusted herein to a value close to a ground potential, such as 0.1 V. The first RS latch 104 is reset based on the output of the first comparator 109. The voltage of the second capacitor 108 is assumed to be Vc2 (included in the first output signal).

In the lamp signal generating circuit 100 of FIG. 1, an inverter 110 receives the frequency divided signal CLK1 from the frequency dividing circuit 101, inverts the logic of the frequency divided signal CLK1, and outputs the inverted logic of the frequency divided signal CLK1. A second constant current circuit 111 allows the constant current Ic to flow, similarly to the first constant current circuit 102. The second constant current circuit 111 receives an output signal from the inverter 110 and allows the constant current to flow when the output signal from the inverter 110 is on the "H" level, i.e., when the frequency divided signal CLK1 is on the "L" level. A second rising edge detecting circuit 112 outputs a one-shot pulse in synchronization with the rising edge of the output signal from the inverter 110. A second RS latch 113 is set by the one-shot pulse from the second rising edge detecting circuit 112. Each of a third N-channel FET 114 and a fourth N-channel FET 115, which are connected in series, receives an output signal from the second RS latch 113 at the gate thereof. A third capacitor 116 having a third electrostatic capacitance equal to the first electrostatic capacitance is connected between the drain and source of the third N-channel FET 114. A fourth capacitor 117 having a fourth electrostatic capacitance equal to the second electrostatic capacitance is connected between the drain and source of the fourth N-channel FET 115. The third N-channel FET 114 and the third capacitor 116 are connected to the second constant current circuit 111. The fourth N-channel FET 115 and the fourth capacitor 117 are grounded. A second comparator 118 compares the voltage Vc3 (included in a second output signal) of a series circuit composed of the third and fourth capacitors 116 and 117 with the reference voltage Vr1 and outputs the result of the comparison. The second RS latch 113 is reset based on the output of the second comparator 118. The voltage of the fourth capacitor 117 is assumed to be Vc4 (included in the second output signal).

In the lamp signal generating circuit 100 of FIG. 1, a third comparator 119 compares the voltage Vc1 of the series circuit composed of the first and second capacitors 107 and 108 with the voltage Vc4 of the fourth capacitor 117 and outputs the result of the comparison. A fourth comparator 120 compares the voltage Vc3 of the series circuit composed of the third and fourth capacitors 116 and 117 with the voltage Vc2 of the second capacitor 108 and outputs the result of the comparison. An OR gate 121 receives the respective outputs of the third and fourth comparators 119 and 120 and generates an output Vgc. A fifth N-channel FET 122 receives the output Vgc of the OR gate 121 at the gate thereof and has the source thereof grounded. A fifth capacitor 123 is connected between the drain and source of the fifth N-channel FET 122. A third constant current circuit 124 is connected to the drain of the fifth N-channel FET 122. The drain voltage of the fifth N-channel FET 122, i.e., the voltage of the fifth capacitor 123 is outputted as a lamp signal Vc.

A description will be given herein below to the operation of the lamp signal generating circuit 100, which is the characteristic portion of the DC-DC converter according to the first embodiment, with reference to FIGS. 1 and 2. FIG. 2 represents the operation of the lamp signal generating circuit 100, specifically the operations of the individual components of the lamp signal generating circuit 100. In short, FIG. 2 is an operation waveform chart of the clock signal CLK, the frequency divided signal CLK1, the voltage Vc1, the voltage Vc4, the voltage Vc2, the voltage Vc3, the output Vgc, and the lamp signal Vc.

As shown in FIG. 2, the clock signal CLK has a specified period and repeats the "H" level and the "L" level. The frequency divided signal CLK1 resulting from the halving of the frequency of the clock signal CLK by the frequency dividing circuit 101 has a period double the period of the clock signal CLK and repeats the "H" level and the "L" level in synchronization with the rising edge of the clock signal CLK. When the frequency divided signal CLK1 rises to the "H" level, the rising edge detecting circuit 103 that has detected the rising edge thereof outputs the one-shot pulse to set the first RS latch 104.

The RS latch 104 that has been set brings the output thereof to the "H" level and turns ON each of the first and second N-channel FETs 105 and 106. By the turning ON of each of the first and second N-channel FETs 105 and 106, the series circuit composed of the first and second capacitors 107 and 108 is discharged so that the voltage Vc1 thereof rapidly drops to zero. When the voltage Vc1 of the series circuit composed of the first and second capacitors 107 and 108 becomes lower than the reference voltage Vr1 (=0.1 V), the first comparator 109 outputs the "H" level and resets the first RS latch 104.

The first RS latch 104 that has been outputs the "L" level and turns OFF each of the first and second N-channel FETs 105 and 106. On the other hand, since the frequency divided signal CLK1 is on the "H" level, the first constant current circuit 102 supplies the constant current Ic. Accordingly, when each of the first and second N-channel FETs 105 and 106 is tuned OFF, each of the first and second capacitors 107 and 108 is charged with the constant current Ic so that the voltage Vc1 of the series circuit composed of the first and second capacitors 107 and 108 linearly increases. If the respective electrostatic capacitances of the first and second capacitors 107 and 108 are assumed to be C1 and C2, the voltage Vc1 and the voltage Vc2 of the second capacitor 108 are represented by the following numerical expressions:

$$Vc1 = Ic \times t \times (1/C1 + 1/C2) \quad (1)$$

$$Vc2 = Ic \times t / C2 \quad (2).$$

When the frequency divided signal CLK1 falls to the "L" level, the first constant current circuit 102 halts the operation thereof and no more supplies the constant current so that the voltage Vc1 of the series circuit composed of the first and second capacitors 107 and 108 is held invariable. If the period of the clock signal CLK is assumed to be Ts, the voltages Vc1 and Vc2 at this time are represented by the following numerical expressions (3) and (4):

$$Vc1 = Ic \times Ts \times (1/C1 + 1/C2) \quad (3)$$

$$Vc2 = Ic \times Ts / C2 \quad (4).$$

As for the structures and operations of the second constant current circuit 111, the second rising edge detecting circuit 112, the second RS latch 113, the third N-channel FET 114, the fourth N-channel FET 115, the third capacitor 116, the fourth capacitor 117, and the second comparator 118 after the inversion of the logic of the frequency divided signal CLK1 by the inverter 110, they are basically the same as the structures and operations of the first constant current circuit 102, the first rising edge detecting circuit 103, the first RS latch 104, the first N-channel FET 105, the second N-channel FET 106, the first capacitor 107, the second capacitor 108, and the first comparator 109 described above. However, since the frequency divided signal CLK1 inverted via the inverter 110 is inputted, the voltage value Vc3 of the series circuit composed of the third and fourth capacitors 116 and 117 and the voltage Vc4 of the fourth capacitor 117 are held during the time period when the frequency divided signal CLK1 is on the "H" level and the first and second capacitors 107 and 108 are charged. Conversely, the series circuit composed of the third and fourth capacitors 116 and 117 and the fourth capacitor 117 are charged to the respective voltages Vc3 and Vc4 during the time period when the frequency divided signal CLK1 is on the "L" level and the voltage of the series circuit composed of the first and second capacitors 107 and 108 is held. Thus, the voltage Vc3 of the series circuit composed of the third and fourth capacitors 116 and 117 and the voltage Vc4 of the fourth capacitor 117 are different in phase from the voltage Vc1 of the series circuit composed of the first and second capacitors 107 and 108 and the voltage Vc2 of the second capacitor 108 but vary in the same manner as the voltages Vc1 and Vc2, respectively.

It is to be noted that, when "H" level is outputted from the third comparator 119, Vc1<Vc4 is satisfied and the frequency divided signal CLK1 is on the "H" level, which corresponds to a time period Tq till the rising voltage Vc1 reaches the voltage Vc4, as shown in FIG. 2. During the lapse of the time period Tq, the following numerical expression (5) is satisfied:

$$Ic \times Tq \times (1/C1 + 1/C2) = Ic \times Ts / C2 \quad (5).$$

Therefore, the time period Tq is represented by the following numerical expression (6):

$$Tq = Ts \times C1 / (C1 + C2) \quad (6).$$

Likewise, when the "H" level is outputted from the fourth comparator 120, Vc2<Vc3 is satisfied and the frequency divided signal CLK1 is on the "L" level, which corresponds to the time period till the rising voltage Vc3 reaches the voltage Vc2, as shown in FIG. 2. Accordingly, the time period can also be determined in the same manner as described above to become equal to the time period Tq described above. Hence, the output Vgc of the OR gate 121, which is the logical OR between the respective outputs of the third and fourth comparators 119 and 120, remains on the "H" level only during the time period Tq in synchronization with the clock signal CLK, as shown in FIG. 2. During the time period when the output Vgc of the OR gate 121 is on the "H" level, the fifth N-channel FET 122 is in the ON state and the fifth capacitor 123 is earthed so that the lamp signal Vc is zero, as shown in FIG. 2. During the time period when the output Vgc of the OR gate 121 is on the "L" level, on the other hand, the fifth capacitor 123 is charged by the third constant current circuit 124 so that the lamp signal Vc rises, as shown in FIG. 2.

As represented by the foregoing numerical expression (6), the time period Tq during which the lamp signal Vc is zero can be adjusted with the electrostatic capacitances C1 and C2 and set to a value obtained by multiplying the period Ts of the clock signal CLK by C1/(C1+C2). If Tq=0.4×Ts is to be satisfied, settings which satisfy C2=1.5×C1 may be made appropriately.

Thus, the first embodiment allows the generation of the lamp signal for slope compensation which increases after the lapse of a time period corresponding to a specified percentage of the period of an arbitrary external clock signal in an external-synchronization-type DC-DC converter in a current-mode control system.

EMBODIMENT 2

Figure 3:
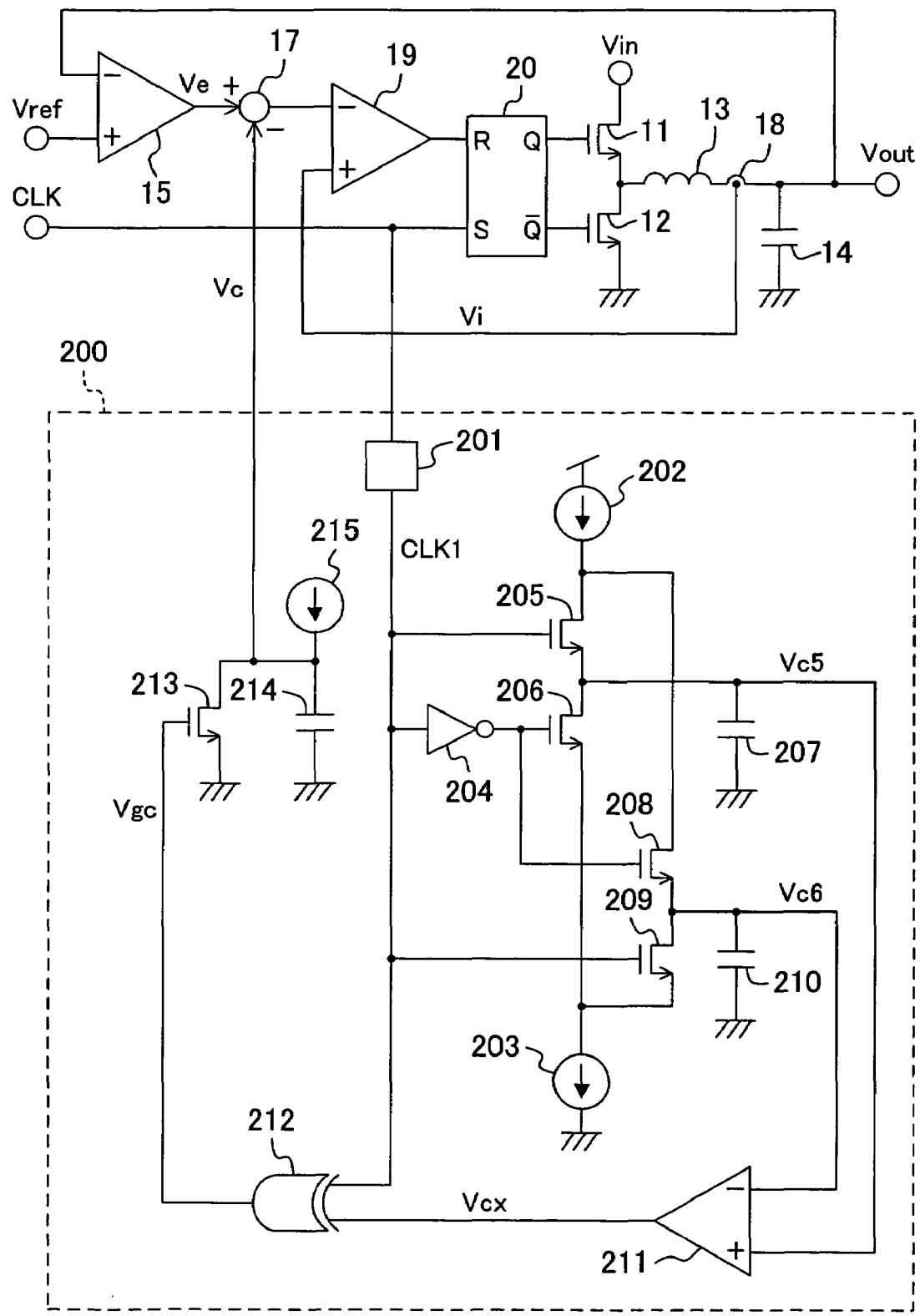
FIG. 3 is a circuit structural view of a DC-DC converter according to a second embodiment of the present invention.

A DC-DC converter according to a second embodiment of the present invention will be described herein below with reference to FIGS. 3 and 4. FIG. 3 is a circuit structural view of the DC-DC converter according to the second embodiment.

The description of the components shown in FIG. 3 which are the same as those of the DC-DC converter according to the first embodiment shown in FIG. 1 will be omitted by retaining the same reference numerals. The DC-DC converter according to the second embodiment is different from the DC-DC converter according to the first embodiment shown in FIG. 1 in the structure of the lamp signal generating circuit, which is the characteristic portion of the DC-DC converter according to the second embodiment. Therefore, a description will be given herein below to the structure and operation of a lamp signal generating circuit (lamp signal generating means) 200 shown in FIG. 3.

In the lamp signal generating circuit 200 of FIG. 3, a frequency dividing circuit 201 halves the frequency of the clock signal CLK and outputs the frequency divided signal CLK1 having the period double the period of the clock signal CLK. A first constant current circuit 202 allows the constant current I1 to flow from the higher-potential side, while a second constant current circuit 203 allows a constant current I2 to flow to the ground. It is assumed that, when the potential of the second constant current circuit 203 approaches the ground potential, the second constant current circuit 203 loses the function as a current source and can no more allow the current to flow. An inverter 204 receives the frequency divided signal CLK1, inverts the logic of the frequency divided signal CLK1, and outputs the inverted logic of the frequency divided signal CLK1. A first N-channel FET 205 and a second N-channel FET 206 are connected in series. The first N-channel FET 205 has the drain thereof connected to the first constant current circuit 202. The second N-channel FET 206 has the source thereof connected to the second constant current circuit 203. The first N-channel FET 205 receives the frequency divided signal CLK1 at the gate thereof. The second N-channel FET 206 receives an output signal from the inverter 204 at the gate thereof. A first capacitor 207 having a first electrostatic capacitance is connected between the ground and the connection point between the first and second N-channel FETs 205 and 206. The potential of the first capacitor 207 is assumed to be Vc5 (corresponding to the first output signal).

In the lamp signal generating circuit 200 of FIG. 3, a third N-channel FET 208 and a fourth N-channel FET 209 are connected in series. The third N-channel FET 208 has the drain thereof connected to the first constant current circuit 202. The fourth N-channel FET 209 has the source thereof connected to the second constant current circuit 203. The third N-channel FET 208 receives the output signal from the inverter 204 at the gate thereof. The fourth N-channel FET 209 receives the frequency divided signal CLK1 at the gate thereof. A second capacitor 210 having a second electrostatic capacitance equal to the first electrostatic capacitance is connected between the ground and the connection point between the third and fourth N-channel FETs 208 and 209. The potential of the second capacitor 210 is assumed to be Vc6 (corresponding to a second output signal).

In the lamp signal generator 200 circuit of FIG. 3, a comparator 211 compares the voltage Vc5 of the first capacitor 207 with the voltage Vc6 of the second capacitor 210 and generates an output Vcx of the comparator 211. An XOR gate 212 receives the frequency divided signal CLK1 and the output Vcx and generates the output Vgc. A fifth N-channel FET 213 receives the output Vgc of the XOR gate 212 at the gate thereof and has the source thereof grounded. A third capacitor 214 is connected between the drain and source of the fifth N-channel FET 213. A third constant current circuit 215 is connected to the drain of the fifth N-channel FET 213. The drain voltage of the fifth N-channel FET 213, i.e., the voltage of the third capacitor 214 is outputted as the lamp signal Vc.

A description will be given herein below to the operation of the lamp signal generating circuit 200, which is the characteristic portion of the DC-DC converter according to the second embodiment, with reference to FIGS. 3 and 4. FIG. 4 represents the operation of the lamp signal generating circuit 200, specifically the operations of the individual components of the lamp signal generating circuit 200. In short, FIG. 4 is an operation waveform chart of the clock signal CLK, the frequency divided signal CLK1, the voltage Vc5, the voltage Vc6, the voltage Vcx, the output Vgc, and the lamp signal Vc.

Figure 4:
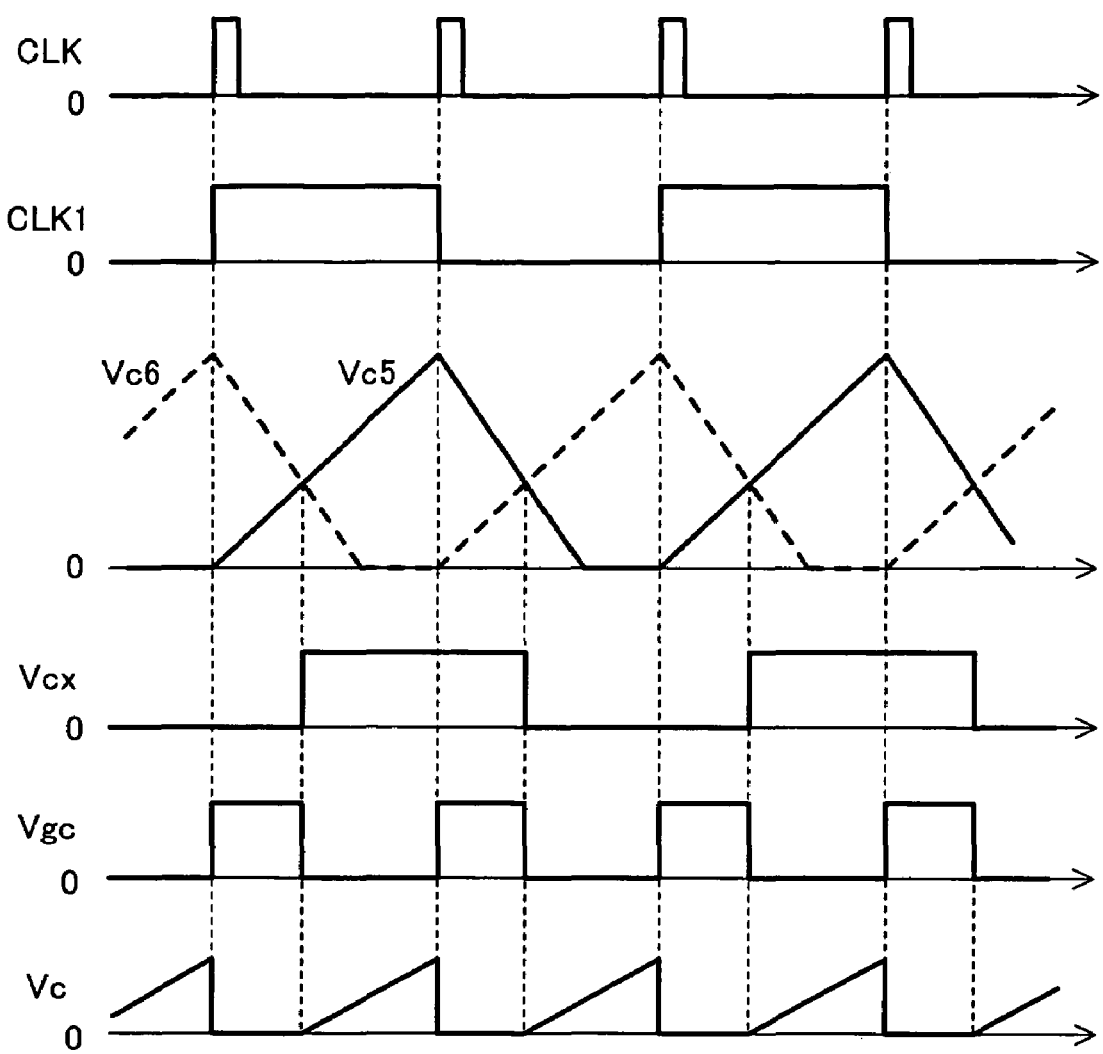
FIG. 4 is an operation waveform chart of the individual components of a lamp signal generating circuit 200 composing the DC-DC converter according to the second embodiment.

As shown in FIG. 4, the clock signal CLK has a specified period and repeats the "H" level and the "L" level. The frequency divided signal CLK1 resulting from the halving of the frequency of the clock signal CLK by the frequency dividing circuit 201 has a period double the period of the clock signal CLK and repeats the "H" level and the "L" level in synchronization with the rising edge of the clock signal CLK. When the frequency divided signal CLK1 rises to the "H" level, the first and fourth N-channel FETs 205 and 209 each of which receives the frequency divided signal CLK1 at the gate thereof are brought into the ON state, while the second and third N-channel FETs 206 and 208 each of which receives the inverted frequency divided signal CLK1 at the gate thereof via the inverter 204 are brought into the OFF state. As a result, the first capacitor 207 is charged with the constant current I1 of the first constant current circuit 202, while the second capacitor 210 is discharged with supply the constant current I2 of the second constant current circuit 203. Since the constant current I2 has been set to be larger than the constant current I1, the voltage Vc6 of the second capacitor 210 reaches zero during the time period when the frequency divided signal CLK1 is on the "H" level.

When the frequency divided signal CLK1 is on the "L" level, the first and fourth N-channel FETs 205 and 209 are in the OFF state, while the second and third N-channel FETs 206 and 208 are in the ON state. As a result, the first capacitor 207 is discharged with supply the constant current I2 of the second constant current circuit 203, while the second capacitor 210 is charged with the constant current I1 of the first constant current circuit 202. The voltage Vc5 of the first capacitor 207 reaches zero during the time period when the frequency divided signal CLK1 is on the "L" level.

If the period of the clock signal CLK when the frequency divided signal CLK1 is on the "H" level is assumed to be Ts, the voltage Vc5 of the charged first capacitor 207 and the voltage Vc6 of the discharged second capacitor 210 are represented by the following numerical expressions (7) and (8), respectively:

$$Vc5 = I1 \times t/C \tag{7}$$

$$Vc6 = (I1 \times Ts - I2 \times t)/C \tag{8}$$

When the frequency divided signal CLK1 is on the "L" level, the voltages represented by the foregoing two numerical expressions are switched to each other, i.e., the voltage Vc5 is represented by the numerical expression (8) and the voltage Vc6 is represented by the numerical expression (7).

The comparator 211 compares the voltage Vc5 of the first capacitor 207 with the voltage Vc6 of the second capacitor 210 and outputs the result of the comparison. Consequently, the output Vcx of the comparator 211 is inverted when the voltages Vc5 and Vc6 which repeatedly increase and decrease in opposite phases in synchronization with the clock signal CLK intersect each other, as shown in FIG. 4. With regards to a time period Ty from the rising edge of the clock signal CLK till the intersection of the voltages Vc5 and Vc6, the following numerical expression (9) is satisfied:

$$I1 \times Ty/C = (I1 \times Ts - I2 \times Ty)/C \tag{9}$$

so that the time period Ty is represented by the following numerical expression (10):

$$Ty = Ts \times I1/(I1 + I2) \tag{10}$$

As shown in FIG. 4, the output Vgc of the XOR gate 212 is the exclusive OR between the output Vcx of the comparator 211 and the frequency divided signal CLK1 so that the output Vgc rises to the "H" level in synchronization with the clock signal CLK and falls to the "L" level after the lapse of the time period Ty. During the time period when the output Vgc of the XOR gate 212 is on the "H" level, the fifth N-channel FET 213 is in the ON state and the third capacitor 214 is earthed so that the lamp signal Vc is zero. During the time period when the output Vgc of the XOR gate 212 is on the "L" level, on the other hand, the third capacitor 214 is charged with the current of the third constant current circuit 215 so that the lamp signal Vc rises.

Since the time period Ty during which the lamp signal Vc is zero can be adjusted with the current value I1 of the first constant current circuit 202 and the current value I2 of the second constant current circuit 203, the time period Ty can be set to a value obtained by multiplying the period Ts of the clock signal CLK by I1/(I1+I2). If Ty=0.4×Ts is to be satisfied, settings which satisfy I2=1.5×I1 may be made appropriately.

Thus, the second embodiment allows the generation of the lamp signal for slope compensation which increases after the lapse of a time period corresponding to a specified percentage of the period of an arbitrary external clock signal in an external-synchronization-type DC-DC converter in a current-mode control system.

The second embodiment has described above the case where the constant current I2 is set larger than the constant current I1. The reason for this is that, if the constant current I2 as a discharge current is not larger than the constant current I1 as a charge current, the voltage of the capacitor does not reach a zero value due to the charge remaining in the capacitor at the end point of the period and therefore the time period Ty cannot be determined. However, by discharging the capacitor to remove the charge remaining therein before it is charged, the voltage of the capacitor is allowed to reach the zero value before charging the capacitor so that the constant current I2 need not necessarily be set larger than the constant current I1. In other words, the constant current I2 may also have a value not more than the constant current I1 by constituting the DC-DC converter according to the second embodiment such that the first capacitor 207 is rapidly discharged and then charged with the constant current upon detecting the reaching of the "H" level by the frequency divided signal CLK1 from the rising edge thereof and that the second capacitor 210 is rapidly discharged and then charged with the constant current upon detecting the reaching of the "L" level by the frequency divided signal CLK1 from the falling edge thereof. The DC-DC converter according to the second embodiment may also be constituted such that the second capacitor 210 is rapidly discharged upon detecting the reaching of the "H" level by the output Vcx of the comparator 211 instead of the frequency divided signal CLK1 and that the first capacitor 207 is rapidly discharged upon detecting the reaching of the "L" level by the output Vcx. The DC-DC converter according to the second embodiment may also be constituted such that the second capacitor 210 is rapidly discharged upon detecting the reaching of the "H" level by each of the frequency divided signal CLK1 and the output Vcx of the comparator 211 as a result of performing a logical AND operation therebetween and that the first capacitor 207 is rapidly discharged upon detecting the reaching of the "L" level by each of the frequency divided signal CLK1 and the output Vcx of the comparator 211 as a result of performing a logical NOR operation therebetween. By thus constituting the DC-DC converter according to the second embodiment, it becomes also possible to set the generation of the lamp signal for slope compensation in the second half of the period.

EMBODIMENT 3

Figure 5A:
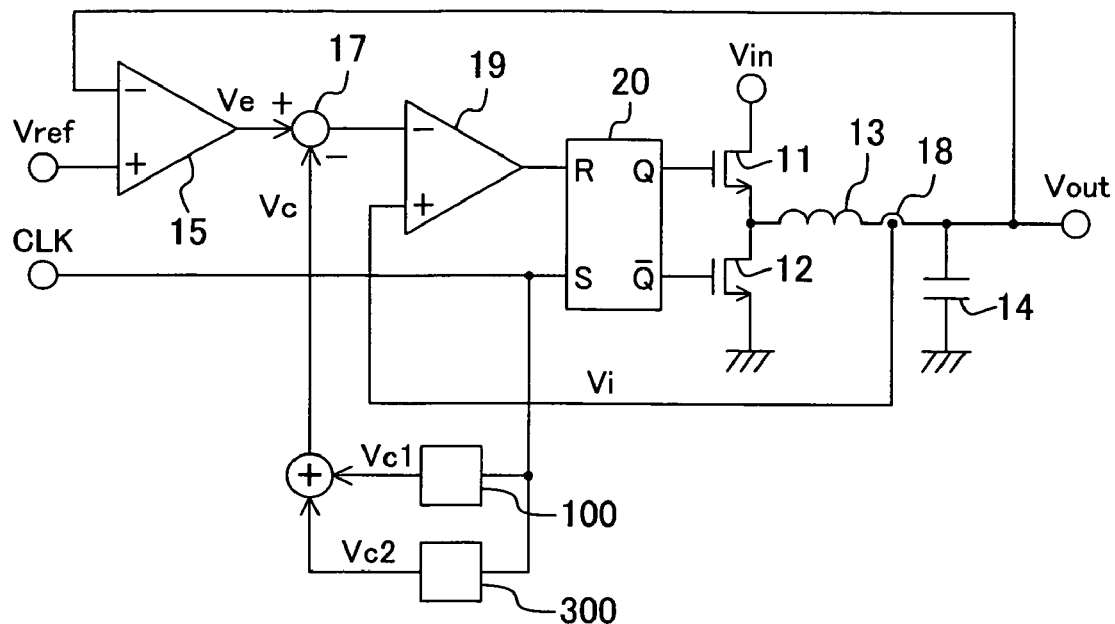
FIG. 5A is a circuit structural view of a DC-DC converter according to a third embodiment of the present invention and FIG. 5B is an operation waveform chart of the principal components of a lamp signal generating circuit in the DC-DC converter according to the third embodiment.
Figure 5B:
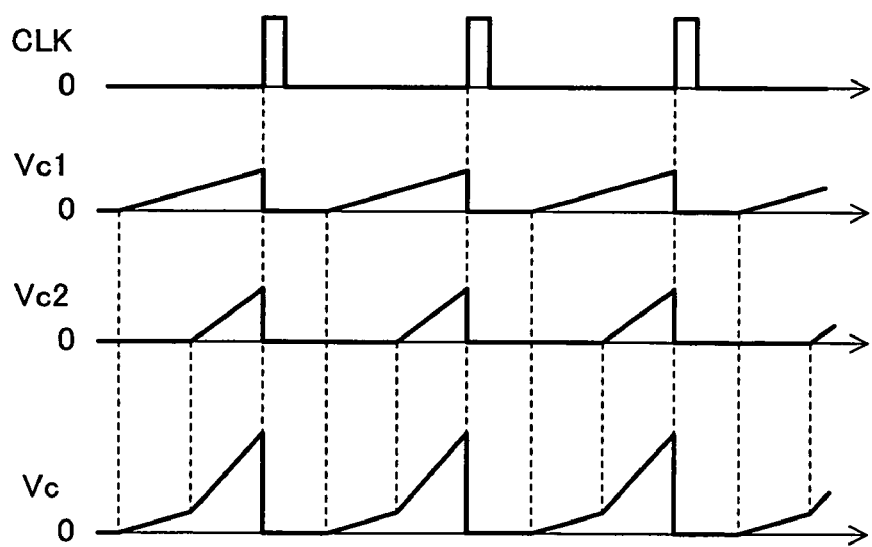
Figure 6A:
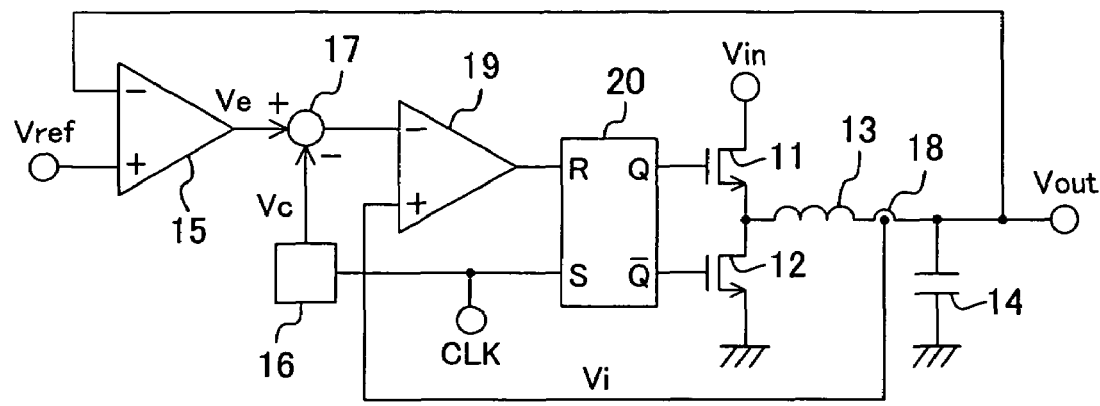
FIG. 6A is a circuit structural view of a conventional DC-DC converter and FIG. 6B is an operation waveform chart of the principal components of the conventional DC-DC converter.
Figure 6B:
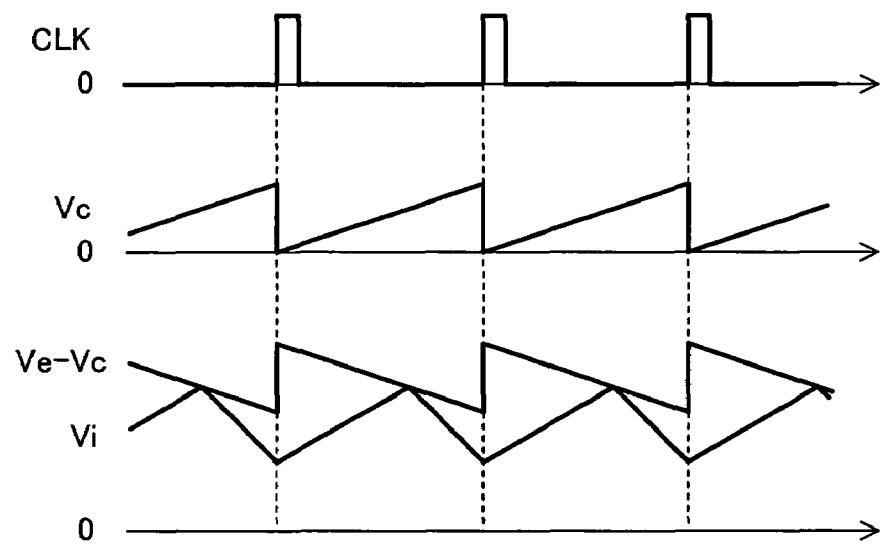

A DC-DC converter according to a third embodiment of the present invention will be described herein below with reference to FIGS. 5A and 5B. FIG. 5A is a circuit structural view of the DC-DC converter according to the third embodiment. FIG. 5B is a waveform chart of the principal components of the DC-DC converter according to the third embodiment. The description of the components shown in FIG. 5A which are the same as those of the DC-DC converter according to the first embodiment shown in FIG. 1 will be omitted by retaining the same reference numerals.

The DC-DC converter according to the third embodiment is different from the DC-DC converter shown in FIG. 1 in the structure of the lamp signal generating circuit. Specifically, the DC-DC converter according to the third embodiment also has, in addition to the lamp signal generating circuit 100 shown in FIG. 1, a lamp signal generating circuit (lamp signal generating means) 300 having the same structure as the lamp signal generating circuit 100. In the arrangement, the lamp signal Vc is obtained by adding up the first lamp signal Vc1 outputted from the lamp signal generating circuit 100 and a second lamp signal Vc2 outputted from the lamp signal generating circuit 300. In the lamp signal generating circuit 300, the ratio of the area occupied by the capacitor to the entire area of the lamp signal generating circuit has been adjusted to be lower than that in the lamp signal generating circuit 100. For example, the second lamp signal Vc2 has the waveform which starts to rise when a time period corresponding to 70% of the period thereof has elapsed, in contrast to the first lamp signal Vc1 having the waveform which starts to rise when a time period corresponding to 40% of the period thereof has elapsed, as shown in FIG. 5B. The arrangement allows the lamp signal Vc resulting from the addition of the first and second lamp signals Vc1 and Vc2 to implement slope compensation which is more intense at a later time in the second half of the period.

Thus, according to the third embodiment, the slope of the lamp signal Vc is preferably larger at a later time in the second half of the period. By the circuit structure according to the present embodiment, the present invention is allowed to more remarkably achieve the effect of supplying a sufficient output power during a low-input-voltage operation.

The present invention is preferably applied to a DC-DC converter in a current-mode control system which has an external synchronization function.

What is claimed is:
1. A DC-DC converter comprising:
switching means which receives an input voltage and generates a continuous switching voltage having a specified period from the input voltage;
output voltage generating means which receives the switching voltage from the switching means at an inductor and generates an output voltage obtained by rectifying and smoothing a voltage generated in the inductor;
lamp signal generating means which generates a lamp signal and outputs the generated lamp signal; and
control means which performs an arithmetic operation using a current signal relative to a current flowing in the inductor, an error signal relative to the output voltage, and the lamp signal from the lamp signal generating means to generate a control signal for controlling an operation of the switching means and outputs the generated control signal to the switching means, wherein the lamp signal generating means includes:

first signal generating means for generating a first output signal based on a frequency divided signal having first and second periods obtained by dividing a frequency of a clock signal having the specified period; and second signal generating means for generating a second output signal having a phase 180 degrees different from a phase of the first output signal based on the frequency divided signal, generates, based on the first and second outputs signals, the lamp signal which rises after being held at a constant value for a specified time period in each of the first and second periods, and outputs the generated lamp signal.

2. The DC-DC converter of claim 1, wherein the lamp signal generating means further comprises:

a frequency dividing circuit for dividing the frequency of the clock signal and outputting the frequency divided signal, the first signal generating means includes at least a first series circuit composed of a first capacitor having a first electrostatic capacitance and a second capacitor having a second electrostatic capacitance, the first series circuit operating based on the frequency divided signal, being discharged at an initiation of the first period and then charged with a constant current later in the first period, and holding, in the second period, a voltage resulting from the charging in the first period, the second signal generating means includes at least a second series circuit composed of a third capacitor having a third electrostatic capacitance equal to the first electrostatic capacitance and a fourth capacitor having a fourth electrostatic capacitance equal to the second electrostatic capacitance, the second series circuit being discharged at an initiation of the second period and then charged with a constant current later in the second period based on the frequency divided signal and holding, in the first period, a voltage resulting from the charging in the second period, and the lamp signal generating means holds the lamp signal at the constant value during a time period in the first period till a voltage of the first series circuit corresponding to the first output signal reaches a voltage of the fourth capacitor corresponding to the second output signal and during a time period in the second period till a voltage of the second series circuit corresponding to the second output signal reaches a voltage of the second capacitor corresponding to the first output signal.

3. The DC-DC converter of claim 2, wherein the first electrostatic capacitance is smaller than the second electrostatic capacitance.

4. The DC-DC converter of claim 1, wherein the lamp signal generating means further comprises:

a frequency dividing circuit for dividing the frequency of the clock signal and outputting the frequency divided signal, the first signal generating means includes at least a first capacitor having a first electrostatic capacitance, the first capacitor being charged with a constant current having a first value in the first period based on the frequency divided signal and then discharged to supply a constant current having a second value in the second period, the second signal generating means includes at least a second capacitor having a second electrostatic capacitance equal to the first electrostatic capacitance, the second capacitor being discharged to supply the constant current having the second value in the first period based on the frequency divided signal and then charged with the constant current having the first value in the second period, and the lamp signal generating means holds the lamp signal at the constant value during a time period in the first period till a voltage of the first capacitor corresponding to the first output signal reaches a voltage of the second capacitor corresponding to the second output signal and during a time period in the second period till the voltage of the second capacitor corresponding to the second output signal reaches the voltage of the first capacitor corresponding to the first output signal.

5. The DC-DC converter of claim 4, wherein the constant current having the first value is smaller than the constant current having the second value.

6. The DC-DC converter of claim 4, wherein the lamp signal generating means discharges the first capacitor before the first capacitor is charged with the constant current in the first period and discharges the second capacitor before the second capacitor is charged with the constant current in the second period.

7. The DC-DC converter of claim 1, wherein the lamp signal generating means includes a plurality of lamp signal generating means each for outputting the lamp signal and a signal obtained by adding up the respective lamp signals outputted from the plurality of lamp signal generating means is outputted to the control means.

* * * * *